UNITED STATES PATENT OFFICE.

ALPHONSO RAYMOND, THOMAS LOWTHER, AND DAVID PERRY, OF BOBRIK, RUSSIA.

INCRUSTATION PREVENTIVE AND METHOD OF MANUFACTURE.

SPECIFICATION forming part of Letters Patent No. 724,331, dated March 31, 1903.

Application filed January 8, 1901. Serial No. 42,554. (No specimens.)

*To all whom it may concern:*

Be it known that we, ALPHONSO RAYMOND, THOMAS LOWTHER, and DAVID PERRY, subjects of the Queen of Great Britain and Ireland, residing at Bobrik, Tchernigoff Government, Russia, have invented a new or Improved Incrustation Preventive and Process of Making Same, of which the following is a specification.

This invention has reference to the manufacture and use of material specially adapted for employment in steam-generators, water-tanks, and other water-containing vessels for the purpose of removing therefrom any incrustation that may have become formed therein and for preventing any subsequent formation of incrustation. The material consists of or contains a soluble extract derived from plants of the order *leguminosæ* and preferably from those of the suborder *papilionaceæ*. The extract may be prepared from the green stalk, stem, root, and pod portions of the plant or from the ripe or unripe seed, or from two or all of these portions of the plant, and the said extract may be used in the liquid, semiliquid, or solid condition or in admixture with other material.

In carrying out the invention any suitable variety of plant of the kind referred to that can be readily and cheaply obtained—such as tares, vetches, lentils, and peas—may be used. To obtain the best and most economical result, it is preferred to use both the green portions of the plant and also the seed, which may be in the ripe or unripe condition. When using the stalk, stem, root, and pod portions of the plants, (hereinafter called the "green" portions of the plant,) it is important that they should be cut and gathered while still charged with sap and before they have been allowed to become ripe and hard.

When using the green portions of the leguminous plant and also the seed, the extract may be prepared as follows: The green portions of the plant, preferably after being dried, are finely subdivided, which may conveniently be done by passing them through a machine, such as a chaff-cutter or any other suitable machine, and then treated with caustic alkalies and water. While various alkalies may be used to advantage, I preferably employ a mixture of two, calcium hydrate, 0.16 per cent., and sodium carbonate crystallized, two per cent., or 2.16 parts of mixture to one hundred parts water for the purpose of dissolving out the soluble matter. Other alkaline solutions than the one above specified may be used. The cut-up material may be also digested in the water alone at a temperature a little above the normal boiling-point of water, which may conveniently be done by boiling the cut-up material in a closed vessel heated by steam and worked at a pressure a few pounds above ordinary atmospheric pressure, the digestion being continued for several hours and until practically the whole of the soluble matter in the plant is dissolved out and the solution concentrated to a suitable strength, after which the solution is filtered off and run into a storage-tank. Advantageous results have been obtained by digesting the cut-up material for about eight hours at a temperature of about 220° Fahrenheit. When water alone is used in the process of digestion, an alkali should be added to the clear solution produced after filtering out the solid matter. The presence of an alkali in the completed product to an extent which will at least produce a neutral action on litmus-paper is necessary to prevent the extract becoming too sour (acid) in the process of manufacture or subsequently.

The modification of the process in which the alkali is mixed with the matter at the beginning is the more tedious in operation, but is preferable. The modification in which the alkali is not added until the extract is ready for final concentration is quicker, but inferior. Both processes are workable. The first may be most profitably employed where raw materials are expensive and where the waste product—that is to say, the solid materials separated out from the solution—is used as artificial manure. The second process is most profitably employed where raw materials are cheap and plentiful and where the waste product can be used for feeding cattle.

The leguminous seed when in the ripe condition is first reduced to the form of flour or when in the unripe state is sliced, bruised, or ground and then treated with caustic alkalies and water or with water alone in a suitable vessel that is preferably provided with a stirring device or devices, so as to facilitate the solution of the soluble matter contained in the powdered seed. The treatment of the seed is continued until practically the whole of the soluble matter in the seed has been dissolved out, after which the solid or undissolved matter is removed from the solution, which may conveniently be done in a hydroextractor. The clear or filtered solution thus obtained is then added to the solution obtained by the digestion of the green portion of the leguminous plant and the mixed solutions concentrated, or the two solutions may be concentrated separately to a suitable strength and then mixed together. Instead of treating the leguminous seed in a mixing vessel, as described, it may be mixed in such vessel with the solution obtained by the treatment of the green portion of the plant, so as to enrich such solution, which is then concentrated. The concentration of each solution or of the mixed solutions may be carried to any desired extent. It may be only to such an extent as to produce a strong liquid solution, or it may be to such an extent as to form a syrupy liquid or a semisolid or solid mass. The concentrated extract produced by my process is practically a vegetable casein. Conveniently the solution may be concentrated to such an extent as to produce a strong solution and be then mixed with suitable porous or absorbent and easily-powdered material—such, for example, as dry moss or peat—which after being saturated with the solution is dried and subsequently reduced to a finely-divided condition. The mixture may be used in the powdered condition or be compressed into cakes for use.

The vegetable extract hereinbefore described either alone or mixed with other matter may, when it is to be used in a steam-generator, be introduced into the same in any suitable manner, conveniently by adding it to the feed-water supplied to the steam-generator. The said extract can also be advantageously used in tanks and other vessels in which water is heated or stored.

The extract may be used in varying quantities to suit requirement. In the case of a locomotive-boiler that had become nearly unworkable, owing to the accumulation of scale therein, practically the whole of the scale was detached from the tubes and other parts of the boiler by adding about one pound (half a kilogram) of the mixture of extract and absorbent material to the feed-water of the boiler once every twenty-four hours for about six days, the scale falling in a soft pulverulent condition to the bottom of the boiler, whence it was removed from time to time by blowing off. In a clean boiler a smaller quantity of the material added, say, to the feed-water tank every twenty-four hours will serve to effectually keep the inner surface of a large boiler free or practically free from scale.

What we claim is—

1. The process of manufacturing the herein-described soluble extract from the plants of the order *leguminosœ*, and particularly of the suborder *papilionaceœ*, said process consisting in digesting the green portions of the plants in a subdivided condition in water with caustic alkalies at a temperature above the normal boiling-point of water, separating the resulting solution from the undissolved and insoluble matter present, mixing and digesting the seed portion of the plants in a powdered or disintegrated condition in said solution, separating the resulting solution from the undissolved and insoluble matter, and concentrating the solution to a suitable strength or consistency, as set forth.

2. The process of manufacturing the herein-described soluble extract from the plants of the order *leguminosœ* and particularly of the suborder *papilionaceœ*, said process consisting in digesting the green portions of the plants in a subdivided condition in water with caustic alkalies at a temperature above the normal boiling-point of water, separating the resulting solution from the undissolved and insoluble matter present, mixing and digesting the seed portion of the plants in a powdered or disintegrated condition in said solution, separating the resulting solution from the undissolved and insoluble matter, concentrating the solution to a suitable strength or consistency, and mixing the concentrated solution with porous or absorbent material, as set forth.

3. The herein-described article of manufacture for removing and preventing incrustation in water-containing vessels, the sole vegetable component of which is an extract of the suborder *papilionaceœ* of plants of the order *leguminosœ*.

4. The herein-described article of manufacture for removing and preventing incrustation in water-containing vessels, the sole vegetable component of which is an extract of the pulverized seeds of the suborder *papilionaceœ* of plants of the order *leguminosœ*.

5. The herein-described article of manufacture for removing and preventing incrustation in water-containing vessels, the sole vegetable component of which is a neutralized extract of the pulverized seeds of the suborder *papilionaceœ* of plants of the order *leguminosœ*.

Signed at Odessa, Russia, this 13th day of December, 1900.

ALPHONSO RAYMOND.
THOMAS LOWTHER.
DAVID PERRY.

Witnesses:
THOMAS E. HEENAN,
THOMAS MILES.